(12) United States Patent
Spallek et al.

(10) Patent No.: US 12,431,040 B2
(45) Date of Patent: Sep. 30, 2025

(54) MEDICAL TRAINING MODEL HAVING AT LEAST ONE BLOOD VESSEL MODEL

(71) Applicants: TENISCHE UNIVERSITÄT HAMBURG, Hamburg (DE); UNIVERSITÄTSKLINIKUM HAMBURG-EPPENDORF, Hamburg (DE)

(72) Inventors: Johanna Spallek, Hamburg (DE); Juliane Vogt, Menslage (DE); Dieter Krause, Buchholz (DE); Jan-Hendrik Buhk, Hamburg (DE); Andreas Frölich, Hamburh (DE); Jens Fiehler, Hamburg (DE)

(73) Assignees: TECHNISCHE UNIVERSITÄT HAMBURG, Hamburg (DE); UNIVERSITÄTSKLINIKUM HAMBURG—EPPENDORF, Hamburg (DE)

( * ) Notice: Subject to any disclaimer, the term of this patent is extended or adjusted under 35 U.S.C. 154(b) by 365 days.

(21) Appl. No.: 18/012,562

(22) PCT Filed: Jun. 8, 2021

(86) PCT No.: PCT/EP2021/065251
§ 371 (c)(1),
(2) Date: Dec. 22, 2022

(87) PCT Pub. No.: WO2021/259627
PCT Pub. Date: Dec. 30, 2021

(65) Prior Publication Data
US 2023/0245592 A1    Aug. 3, 2023

(30) Foreign Application Priority Data
Jun. 24, 2020    (DE) .................... 10 2020 003 786.0

(51) Int. Cl.
*G09B 23/28*  (2006.01)
*G09B 23/30*  (2006.01)
*G09B 23/34*  (2006.01)

(52) U.S. Cl.
CPC ......... *G09B 23/286* (2013.01); *G09B 23/285* (2013.01); *G09B 23/303* (2013.01); *G09B 23/34* (2013.01)

(58) Field of Classification Search
CPC .. G09B 23/286; G09B 23/303; G09B 23/285; G09B 23/34
(Continued)

(56) References Cited

U.S. PATENT DOCUMENTS 5,320,537 A * 6/1994 Watson .................. G09B 23/28
434/272
5,425,644 A * 6/1995 Szinicz .................. G09B 23/28
434/267
(Continued)

FOREIGN PATENT DOCUMENTS

DE    10 2014 210 893 A1    12/2015
DE    102015011062 A1 *    3/2017
(Continued)

OTHER PUBLICATIONS

Translation_DE102015011062 (Year: 2017).*
(Continued)

*Primary Examiner* — Peter J Macchiarolo
*Assistant Examiner* — Monica S Young
(74) *Attorney, Agent, or Firm* — Kilpatrick Townsend & Stockton LLP

(57) ABSTRACT

Medical training model having at least one blood vessel model (1) which in at least one practice region can be connected to an anatomically replicated substitute blood circulation system (2) and in which a real instrument (17) is used, further having an image recording device (3) for creating measured images of the at least one blood vessel model (1), and having an image processing device (11) which converts the recorded measured images into an imag-
(Continued)

Figure 1:
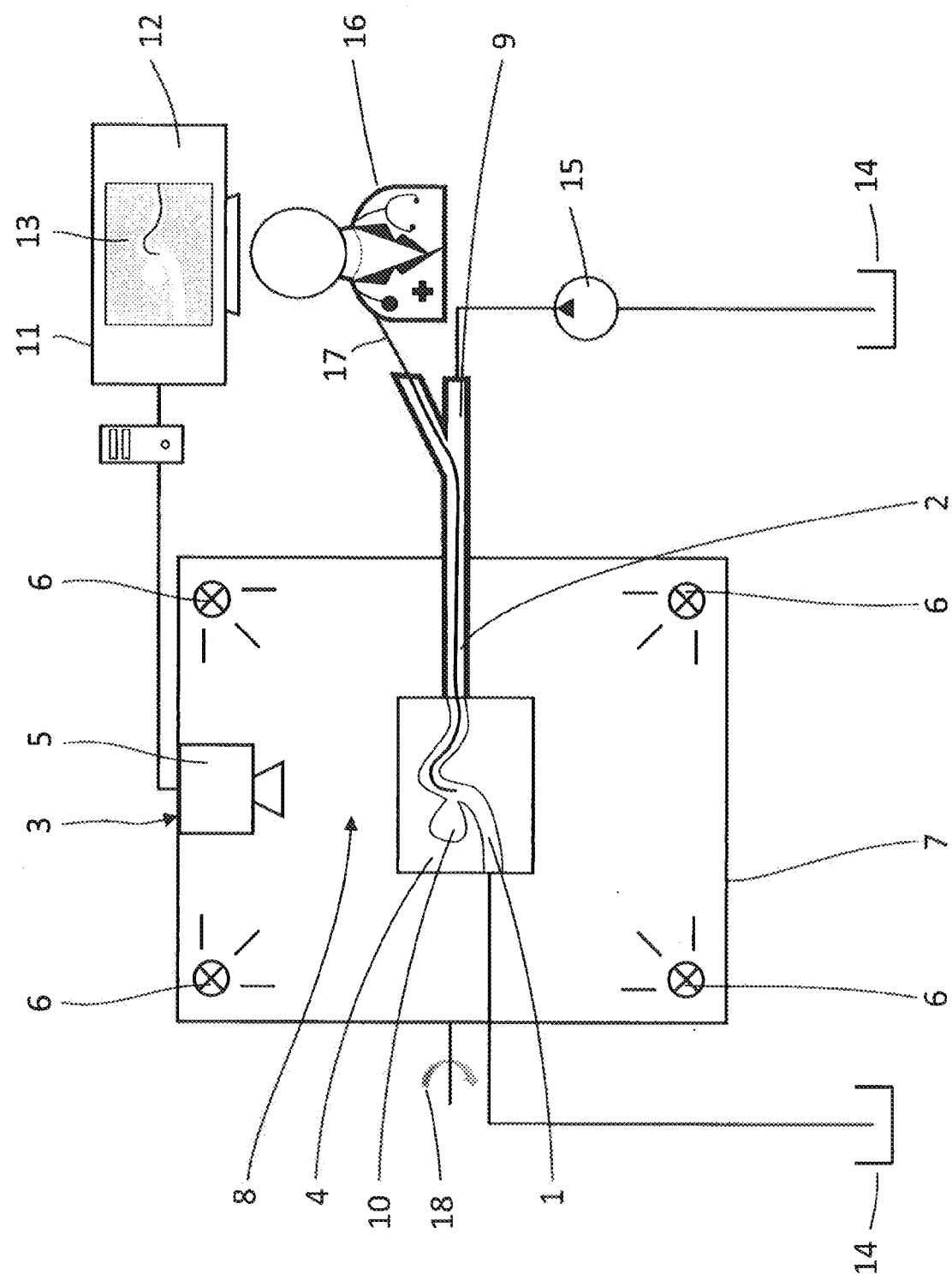

ing blood vessel representation and makes same displayable on a screen (12), wherein the image recording device (3) is designed as a photo-optical system (8) which records transmitted-light images (13) as measured images of the at least one blood vessel model (1) for simulation of medical activity, for which purpose the at least one blood vessel model (1) is replicated in a transparently produced solid-body block (4) for a contrast between transparent solid-body block (4) and non-transparent instrument (17).

12 Claims, 2 Drawing Sheets

(58) Field of Classification Search
USPC .......................................................... 73/866.4
See application file for complete search history.

(56) References Cited

U.S. PATENT DOCUMENTS

| | | | |
|---|---|---|---|
| 5,638,819 A | 6/1997 | Manwaring et al. | |
| 6,517,354 B1 * | 2/2003 | Levy | G09B 23/28 434/262 |
| 12,076,116 B2 * | 9/2024 | Shnaiderman | A61B 5/7257 |

FOREIGN PATENT DOCUMENTS

| | | | | |
|---|---|---|---|---|
| DE | 102016108152 A1 | * | 11/2017 | ........... G09B 23/303 |
| DE | 100 51 244 A1 | | 5/2022 | |
| EP | 0825582 A1 | * | 2/1998 | |
| EP | 2772897 A1 | * | 9/2014 | ........... G09B 23/285 |
| JP | 2015064487 A | * | 4/2015 | |

OTHER PUBLICATIONS

International Search Report for PCT/EP2021/065251 mailed Jul. 7, 2021, all pages.

Johanna Spallek et al., "Design for Mass Adaptation of the Neurointerventional Training Model HANNES with Patient-Specific Aneurysm Models" *Proceedings of the Design Society: International Conference On Engineering Design*, vol. 1, No. 1, Jul. 1, 2019, pp. 897-906 DOI: 10.1017/dsi.2019.94 XP055763807, chapter 4.3.1, 4.3.2; figures 2-5.

German Office Action dated Apr. 9, 2021, 11 pgs.

Vascular Simulations—Cardiac Cycle and Blood Flow Replicator, Vascular Simulations, Mar. 4, 2015, URL: https://www.youtube.com/watch?v=UAf1sld1F08 [URL recherchiert und aufgerufen am Apr. 6, 2021].

\* cited by examiner

MEDICAL TRAINING MODEL HAVING AT LEAST ONE BLOOD VESSEL MODEL

The invention relates to a medical training model according to the preamble of claim 1.

A medical training model offers various possible designs and can be used in particular for the education and training of medical professionals in the minimally invasive catheter treatment of blood vessel diseases such as aneurysms (sacculation of a vessel wall). This replaces the animal experiments used for treatment simulation and training and provides a realistic reproducibility of real human anatomy by recreating relevant vessels. Such a training model is described in Spallek, J.; Kuhl, J.; Wortmann, N.; Buhk, J.-H.; Frölich, A. M.; Nawka, M. T.; Kyselyova, A.; Fiehler, J.; Krause, D.: Design for Mass Adaption of the Neurointerventional Training Model HANNES with Patient-Specific Aneurysm Models. In: Proceedings of the 22nd International Conference on Engineering Design (ICED19), Delft, The Netherlands, 5-8 Aug. 2019, 897-906.

Visual control of medical instruments is usually performed in training models by using individualized blood vessel models in an angiography facility using X-rays.

DE 10 2014 210 893 A1 discloses image recording devices in the medical field, for example X-ray devices with a C-arm on which an X-ray emitter and an X-ray detector are arranged opposite each other. An operating device, for example a touch screen, is provided to the operator for control purposes. Such image recording devices are used in the cardio and vascular fields. X-ray devices having a C-arm are used in particular for observation in vascular surgery (angiography). In this context, a key object is to image specific vessels or at least part of the vascular tree after injection of a contrast agent.

A well-known method in this field is the digital subtraction angiography (DSA). Hereby, an usual X-ray image of the relevant target area is first made, the so-called mask picture. After administration of a contrast agent into the vascular system, the contrast agent spreads in the vascular system and further surveying images are made, especially during a whole time interval, in which the contrast agent can be clearly seen. These images are usually referred to as filling images. In order to be able to visualize the vessels without other, interfering structures, the mask image (often referred to as the blank image) is subtracted from the filling image.

A disadvantage is that using the usual training models for training and learning the necessary treatment skills, especially for the treatment of vascular diseases, it is not possible to do without harmful X-rays, because otherwise it is not possible to observe the instruments.

Alternatively, X-ray-free virtual reality simulations are used, in which the trainees are to be given haptic feedback similar to a treatment on humans. However, the realization is only comparable to the real treatment to a limited extent. Also, only certain training situations can be set. The medical instruments differ from those used in reality. Images and position of the instruments are simulated, whereby the creation of the images relies on feedback from sensors.

So far a method is known from U.S. Pat. No. 5,638,819 A, with which a medical instrument, in particular a biopsy needle or an endoscope, can be inserted along a desired trajectory in a patient, in particular in the brain of a patient. For localization of the instrument, a sensor is attached to its part not inserted into the patient, the position of which can be determined with respect to a reference coordinate system using a suitable measuring device. To navigate the instrument, its position is superimposed on a two-dimensional tomographic image, while simultaneously displaying a live video image of the endoscope. However, this known method is only suitable for the localization and navigation of rigid medical instruments, since only in this case can the position of the sensor attached to the part of the instrument located outside the patient be used to infer the position of the part of the instrument located inside the patient. Applying such a system to a training model is disadvantageous because the treatment skills to be learned are different for blood vessel diseases.

From DE 100 51 244 A1 an X-ray-free intravascular localization and imaging method is known, in which the image recording devices are arranged in the insertion end region of the medical instrument. Image information of the environment of the medical instrument is acquired, and thereby, based on the determined position, the position of the medical instrument is displayed in an overview image of the object under examination. The image data sets themselves can be obtained by means of any imaging method, for example nuclear spin tomography, computer tomography, by means of an X-ray method, in particular a three-dimensional rotational X-ray method, or by means of an ultrasound method. The disadvantage here is also that a training scenario does not allow the use of real instruments and realistic probing and treatment of cerebral aneurysms.

From DE 10 2015 011 062 A1 a device for visual flow analysis of transparent vessel models is known, which is physiologically flowed through by a glycerine solution of blood-like viscosity and is enriched with reflecting polymer particles in the order of magnitude of erythrocytes. A light field camera is used to record the reflections of moving polymer beads. The flow information at the vessel and its alteration by penetration of devices for the therapy of aneurysms will be used to check and optimize the quality of necessary interventions by improved positioning, selection, design or shape of inserted implants like coils, stents or flow-diverters. However, such flow information does not allow to provide the physician with a training model that is used for treatment readjustment of catheter treatments.

A three-dimensional vascular surgery simulation model is also known from DE 10 2016 108 152 A1, in which flow images of a model are performed in a recording space. The model is again located in a circulation fluid, in particular a glycerol-water mixture. Thus, an open flow system is described, in which it does not come to the application of a real treatment instrument, but flow conditions are measured, which provide conclusions about the vessel model. Again, it lacks training as a training model to simulate medical skills. For this, the tracking of a real instrument and the contrast of the same to the vessel is necessary. This is not recognizable from flow images.

It is therefore an object of the invention to provide a training model with the aid of which a training situation can be established in a simple manner in connection with the flow areas of the arterial blood supply, for example of the brain, which comes as close as possible to the corresponding real procedural situations. At the same time, this advantage is to be made possible by a device that is simple and inexpensive to manufacture.

This object is solved by the features of claim 1.

Hereby a medical training model for treatment training scenarios of minimally invasive catheter treatments, such as intracranial aneurysms, that is X-ray-free or has no compelling need for X-rays. X-rays can be replaced by radiation simulation using an optical system. With the overall X-ray-free system, safe training of long duration becomes possible without exposing trainees to harmful radiation. Usual sequences and observations from angiography can be maintained or learned. This is especially true for the simulation of neurointerventional treatments for the education and further training of the medical profession. Real instruments are used. Realistic scanning and treatment of cerebral aneurysms is possible, whereby physiological properties such as temperature, blood flow and pulsation can be simulated.

The solid-body block according to the invention can influence the imaging properties via its external geometry and, isolated therefrom, accommodate blood vessel anatomies, in particular patient-specific anatomies, as inner geometry. Consequently, the solid-state body block preferably combines two different functional units at different locations with selectable space distance. For image performing comprising, for example, a camera, the external geometry is preferably provided with an optical surface that reduces reflection to increase the transmission of the block aneurysm medium.

The visualisation of blood vessels by means of imaging processes for the simulation of medical activity can be carried out using and/or without the use of X-rays. This applies in particular to the creating of digital subtraction imaging as well as a roadmap, imaging data that would have to be obtained by means of an X-ray process are not required and can be omitted entirely. The advantage of making interfering image aspects invisible by subtraction can be exploited.

An X-ray free environment reduces or avoids radiation exposure to the trainees during training. This makes it possible to increase the duration and frequency of training sessions. Trainings for people who are seriously endangered by X-rays, e.g. pregnant women, are made possible.

Preferably, the optical system comprises at least one camera and preferably at least one light source that can be integrated into a head model. Such a head model may provide the ability to rotate the camera and light source system around an aneurysm model in, for example, degree increments to set different observation/projection planes and tomograms of an aneurysm, as is preferably the case with a C-arm of an X-ray system. Preferably, a backlight panel may be used as the light source. The head model can be designed as a set-up device with translational and/or rotational degrees of freedom of movement, and furthermore the space distance between the camera and the light source can be variably selectable. Thus, there is no need for a direct connection between camera and light source.

Furthermore, easy integration with rapid interchangeability of patient-specific vascular geometries in combination with the adaption of a blood circulation system is possible. Realistic training scenarios of neurointerventional treatments become possible according to the invention, without radiation exposure. Furthermore, mobility of the training model is given, allowing its use outside an angiography facility. An increase in the number of training participants is thus possible. A training model can be provided in a radiograph-free environment that designes the vascular space relevant to minimally invasive vascular treatment with the ability to replace individual geometries that may patient-specific, while providing a substitutive formation of a blood circulation system. The invention enables X-ray-free use in angiography.

The structure of the medical training model can be modular and can consist of standardized components (used in every training scenario), variant components (training scenario defining components) and patient-specific components (adapted according to an original patient specific anatomy).

The advantageous use of real instruments, close-to-reality scanning and treatment of cerebral aneurysms, can also be combined with a recreation of physiological properties such as temperature, blood flow and pulsation. The high geometric freedom of additive or generative manufacturing processes enables the production of vessel models that are an exact three-dimensional replica of patient-specific intracranial aneurysms with the adjacent vessel interiors.

Further embodiments and advantages of the invention can be learnt from the following description and the dependent claims.

The invention is described in more detail below with reference to the embodiments shown in the accompanying figures.

Figure 2:
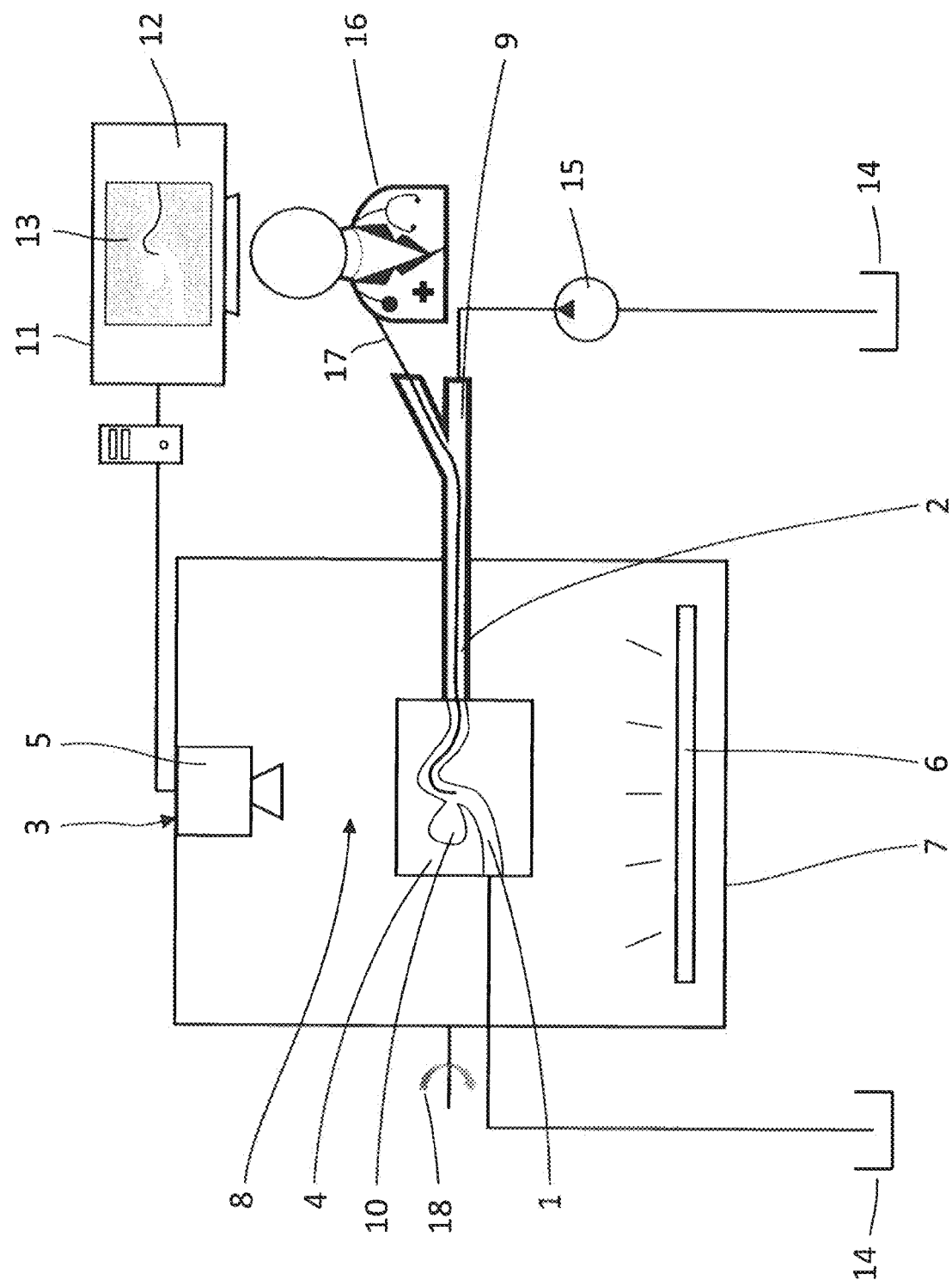

FIG. 1 shows a schematic view of a first embodiment of the medical training model, FIG. 2 shows a schematic view of a second embodiment of the medical training model.

As shown in FIG. 1, the invention relates to a medical training model comprising at least one blood vessel model 1 which is connectable in at least one training region to an anatomically substituve formation of a blood circulation system 2. The training model further comprises an image recording device 3 for creating visible measured images of the at least one blood vessel model 1. Furthermore, the training model comprises an image processing device 11 which converts the recorded measured images into an imaging blood vessel representation and makes them displayable on a screen 12.

For preferably X-ray-free imaging, the image recording device 3 is designed as a photo-optical system 8 that records transmitted-light images 13 as measured images of the at least one blood vessel model 1. For this purpose, the at least one blood vessel model 1 is replicated in a transparently produced solid-body block 4. The blood vessel model 1 is preferably made with a hollow shape 10 in the solid-body block 4. Alternatively or additionally, the hollow shape 10 may be filled with an imaging medium at least temporarily.

The transparent solid-body block 4 preferably has smooth and reflection-reduced surfaces that sandwich a space curve of the blood vessel model 1. Consequently, an external geometry of the solid-body block 4 is preferably provided with an optical surface to reduce reflection and increase transmission of the medium of an artificial transparent block aneurysm. The solid-body block 4 is preferably cuboidal in shape with an external geometry that is selectable depending on the imaging characteristics. The inner geometry of the solid-body block 4 is determined by the replication of an aneurysm, which may be patient-specific.

According to a first embodiment example, the image recording device 3 is designed as a photo-optical system 8, which preferably comprises at least one camera 5 and at least one light source 6. The at least one light source 6 serves an illumination of the solid-body block 4. The direction(s) of an illumination is/are selectable. Side light, incident light, back light, etc. can be used individually as well as in combination. According to FIG. 1, for example, four light sources 6 are provided which illuminate the solid-body block 4 from different directions. It is essential for the illumination that the interior of the solid block 4, the blood vessel model 1 is visible and imageable. The camera 5 and the light source 6 are used to create a real image of the solid block 4 and the vessel model 1.

Preferably, the camera 5 and the light source 6 of the photo-optical system 8 can be integrated into an installation device 7 with translatory and/or rotatory degrees of freedom of movement and, if necessary, can be positioned relative to one another.

The installation device 7 can be designed as a full-arch or C-arch head model of selectable geometry for setting different observation projection planes and/or views of the at least one blood vessel model 1 and can be movable horizontally, vertically and about pivot axes for this purpose. A C-arc-shaped head model is preferably provided for setting different observation projection planes and/or views of the at least one blood vessel model 1. For this purpose, the installation device 7 can be movable horizontally, vertically as well as about swivel axes, as the arrow 18 symbolically illustrates.

The image processing device 11 is preferably program-controlled for digital subtraction imaging. Color fluids may be injectable into the at least one blood vessel model 1 for creating blank images and fill images of the at least one blood vessel model 1.

The at least one blood vessel model 1 is preferably an additively manufactured, optionally individualized blood vessel model 1, which can be interchangeably connected in at least one exercise region to a fluid system of an anatomically replicated training model with a respective optionally patient-specific replicated lumen of the substitutive formation of a blood circulation system 2.

The at least one blood vessel model 1, which may be replicated with patient-specific geometry, may be connected to the substitutive formation of a blood circuit system 2 via a hydraulic quick coupling.

The solid-body block 4 may be made of a casting compound with a lost shape of an inverse replica blood vessel model 1 or by an additive manufacturing process. Multiple exercise regions with blood vessel anatomical geometry may be designed via cuts, allowing the replicated substitute circulatory system 2 to be formed to simulate the human blood circulation system in terms of fluid temperature and pressure. Fluid tank 14 and fluid pump 15 can be used according to known open or closed hydraulic circuits. FIG. 1 further symbolically shows a medical professional 16 using a real instrument 17 in the blood vessel model 1. For this purpose, the instrument 17 is introduced into the substitutive formation of a blood circuit system 2, which has an entry, for example a sluice, for this purpose. During training, the treatment instrument 17 is preferably guided through replicated arteries up to the diseased vessel. Transmitted light makes the movements of the instrument 17 within the vessel model visible and enables the medical professional 16 to move the instrument 17 in a targeted manner.

The blood vessel model 1 is manufactured transparently. This transparent design allows a large contrast between transparent model 1 and non-transparent treatment instrument 17, such as microcatheter, guide wire or coil. The model 1 is manufactured from transparent, in particular non-flexible material, in a transparently manufactured plastic block or solid-body block 4.

The installation device 7 or the head model can be attached to a base frame of the training model 1 on the top side. A connection can be made via a skull base model that can be integrated in the head model, for example, and a neuroflow path 9. The skull base model can simulate the skull base with an integrated vascular course and an integrated holder.

The head model 7 and the skull base model enable the positioning of one or more vessel models 1, in particular so-called aneurysm models. The vessel models 1 can have one or more sacculation(s).

The preferably modular basic structure of the training model allows the combination of modules, namely standardized or variant modules with exchangeable individualized modules. A major focus is on the integration of patient-specific and individualized geometries. Patient-specific aneurysm models, for example, can be manufactured additively, i.e. in a layer construction process or 3D printing, on the basis of medical image data from patients in a standardized individualization process. A portfolio of different aneurysm geometries can be provided as a basis for training.

The invention has been described above using a neuro-interventional training model as an example. The invention can also be put in into practice for any medical training model where patient-specific or standardized blood vessel models are to be placed in interchangeable training method exercise regions. The same applies to training models used as treatment models/simulation models for, for example, scientific purposes, research purposes, instrument development, etc.

As FIG. 2 shows, the image recording device 3 according to a second embodiment example is designed as a photo-optical system 8, which preferably comprises at least one camera 5 and at least one backlight panel 6, between which the transparent solid-body block 4 can be positioned. In all other respects, the above explanations regarding the first embodiment example apply accordingly.

The invention claimed is:
1. A medical training model, comprising:
at least one blood vessel model having a hollow anatomically replicated lumen that corresponds to a vascular anatomy, the at least one blood vessel model configured to be connected in at least one practice region to an anatomically replicated substitute blood circulation system, wherein the anatomically replicated substitute blood circulation system is configured to circulate a fluid through the hollow anatomically replicated lumen of the at least one blood vessel model to simulate a physiological property, and wherein the at least one blood vessel model is adapted to receive a non-transparent medical instrument for practice;
an image recording device configured to create measured images of the at least one blood vessel model; and
an image processing device configured to convert the measured images into an imaging blood vessel representation and to display the imaging blood vessel representation on a screen, wherein:
the image recording device comprises a photo-optical system configured to record transmitted-light images as the measured images of the at least one blood vessel model for simulation of medical activity;
the at least one blood vessel model is replicated within a transparent solid-body block, such that a contrast is created between the transparent solid-body block and the non-transparent medical instrument;
the photo-optical system comprises at least one camera and at least one backlight panel, wherein the at least one blood vessel model replicated within the transparent solid-body block is positioned between the at least one camera and the at least one backlight panel such that the transmitted-light images are recordable as measured images of the at least one blood vessel model in backlight; and the transparent solid-body block is made of a casting compound having a lost shape of an inversely replicated blood vessel model or by an additive manufacturing process.

2. The medical training model according to claim 1, wherein the photo-optical system comprises at least one camera and at least one light source dedicated to detecting a real image of the transparent solid-body block and the at least one blood vessel model.

3. The medical training model according to claim 1, wherein the transparent solid-body block has smooth surfaces configured to reduce surface reflection and increase transmission of light through the transparent solid body block, wherein the smooth surfaces sandwich a space curve of the blood vessel model.

4. The medical training model according to claim 1, further comprising an installation device, wherein the photo-optical system comprises at least one camera and at least one light source, wherein the at least one camera and the at least one light source are integrated into the installation device, the installation device being configured to provide translatory and/or rotatory degrees of freedom of movement such that the camera and light source can be positioned relative to one another during use.

5. The medical training model according to claim 4, wherein the installation device is configured as a full-arch or C-arch head model of selectable geometry, the installation device being adapted to set different observation projection planes and/or views of the at least one blood vessel model, and wherein the installation device is movable horizontally, vertically, and about pivot to enable selection of the observation projection planes and/or the views.

6. The medical training model according to claim 1, wherein the image processing device is program-controlled for digital subtraction imaging.

7. The medical training model according to claim 6, wherein a color fluid is injectable into the hollow anatomically replicated lumen of the at least one blood vessel model for creating blank images and filling images of the at least one blood vessel model.

8. The medical training model according to claim 1, wherein the at least one blood vessel model comprises an individualized blood vessel model, the hollow anatomically replicated lumen is patient-specific, and the individualized blood vessel model is interchangeably connectable in the at least one practice region to the anatomically replicated substitute blood circulation system.

9. The medical training model according to claim 8, the individualized blood vessel model is connectable to the anatomically replicated substitute blood circulation system via a hydraulic quick coupling.

10. The medical training model according to claim 1, wherein the at least one practice region comprises a plurality of practice regions, each practice region comprising a blood vessel anatomical geometry, wherein the plurality of practice regions are implemented within the transparent solid-body block by cuts in the transparent solid-body block.

11. The medical training model according to claim 1, wherein the anatomically replicated substitute blood circulation system is configured to simulate the physiological property by circulating the fluid through the hollow anatomically replicated lumen of the at least one blood vessel model at controlled temperature and pressure of the fluid.

12. The medical training model according to claim 1, wherein the photo-optical system further comprises at least one sidelight or at least one incident light source, and wherein the at least one backlight panel is operable in combination with the at least one sidelight or the at least one incident light source to illuminate the transparent solid-body block and the at least one blood vessel model from different directions.

* * * * *

UNITED STATES PATENT AND TRADEMARK OFFICE
CERTIFICATE OF CORRECTION

| | | |
|---|---|---|
| PATENT NO. | : 12,431,040 B2 | Page 1 of 1 |
| APPLICATION NO. | : 18/012562 | |
| DATED | : September 30, 2025 | |
| INVENTOR(S) | : Johanna Spallek et al. | |

It is certified that error appears in the above-identified patent and that said Letters Patent is hereby corrected as shown below:

On the Title Page

Item (71) Applicants, please delete "TENISCHE" and insert -- TECHNISCHE --

Signed and Sealed this
Thirtieth Day of December, 2025

John A. Squires
*Director of the United States Patent and Trademark Office*